United States Patent [19]

Kawada

[11] Patent Number: 4,884,936
[45] Date of Patent: Dec. 5, 1989

[54] LIFT FOR MOVING A CONTAINER WITH CASTORS

[75] Inventor: Hiroyuki Kawada, Hekinan, Japan

[73] Assignee: Sugiyasu Industries Co., Ltd., Takahama, Japan

[21] Appl. No.: 218,622

[22] Filed: Jul. 13, 1988

[30] Foreign Application Priority Data

Mar. 20, 1988 [JP] Japan ............................. 63-36506[U]

[51] Int. Cl.⁴ ................................................ B60P 1/64
[52] U.S. Cl. ................................ 414/498; 280/43.12; 414/608
[58] Field of Search ................... 280/33.99 T, 47.12, 280/47.27, 47.28, 43.12; 414/457, 608, 498; 248/129

[56] References Cited

U.S. PATENT DOCUMENTS

| | | | |
|---|---|---|---|
| 2,432,368 | 12/1947 | Avril | 280/47.28 |
| 2,675,139 | 4/1954 | Mercier et al. | 414/608 X |
| 3,423,101 | 1/1969 | Boeye | 280/47.12 X |
| 4,538,953 | 9/1985 | Abramson, Jr. | 414/608 |

FOREIGN PATENT DOCUMENTS

| | | |
|---|---|---|
| 6141195 | 3/1986 | Japan. |
| 1281529 | 7/1972 | United Kingdom ................ 414/608 |

*Primary Examiner*—Charles A. Marmor
*Assistant Examiner*—Michael Mar
*Attorney, Agent, or Firm*—Lahive & Cockfield

[57] ABSTRACT

A vehicle for carrying a container with castors from one place to another includes a mobile body and a driving unit supported thereon. A carrier is vertically movably provided on the body adjacent to the driving unit for carrying a container thereon. A member is provided on the carrier for supporting the container at one end thereof, while holding the wheels of the container at the end thereof above the ground when the carrier is in a raised position.

2 Claims, 5 Drawing Sheets

LIFT FOR MOVING A CONTAINER WITH CASTORS

BACKGROUND OF THE INVENTION

1. Field of the Invention

This invention relates to a lift for moving from one place to another a container with castors in which a large amount of goods are packaged together for transportation.

The term "container" as herein used means a case or case-like structure in which a large amount of materials are packaged together for transportation, including not only a typical packing case forming a single truck or rail-wagon load, but also a bogie having an upstanding framework and a pallet provided with a wire net or fence forming a sidewall.

2. Description of the Prior Art

A container with casters is easy to move when it carries no load, but its movement is difficult to control when it carries a heavy cargo. This is particularly the case when it is necessary to move the container on a slope. It is often impossible to push it up on an upward slope, while it is no easy task to control its movement on a downward slope, as it tends to move down by gravity. Therefore, it has hitherto been usual to employ a powered traction device, or a mobile lift which is usually known as a hand pallet.

Even if a traction device is used, however, it is still difficult to draw the container in a desired direction unless the casters happen to be directed for turning in the direction in which the container need be moved. It is necessary to turn the container along an undesirably large curve to change the direction of its movement. If the container is pushed back, there is every likelihood that the casters may turn away from the desired direction.

A large lift is required for hoisting a container with a heavy cargo completely and transporting it. The handling and maintenance of such a lift create a great deal of work.

SUMMARY OF THE INVENTION

It is, therefore, an object of the invention to provide a vehicle which can easily be joined to a container with casters and carry it in a desired direction even on a slope or along a narrow way.

This object is attained by a vehicle which comprises a mobile body, a driving unit supported on the body, a carrier provided vertically movably on the body adjacent to the driving unit for carrying a container with casters thereon, and a member provided on the carrier for supporting the container at one end thereof, while holding the casters at that end of the container above the floor when the carrier is in a raised position.

The container supporting member has an upright back portion secured to the carrier, a bottom portion extending horizontally from the back portion, and an inclined front portion spaced apart from the back portion, rising from the bottom portion at an angle thereto and gradually increasing its distance from the back portion. The front and back portions define therebetween a depression in which a part of the container at one end thereof can be received.

The container supporting member is preferably rotatable about the junction between its back and bottom portions.

The vehicle of this invention is ready to handle and use. The carrier is lowered and inserted below the bottom of a container until the container supporting member is positioned directly below a horizontal transverse member forming a part of the container at one end thereof. If the carrier is, then, raised, the transverse member of the container is held by the container supporting member and the wheels provided on the container below its transverse member are raised above the ground, while the casters provided at the other end of the container stay on the ground. The vehicle is now ready for movement for carrying the container to any place as desired. As the vehicle can be easily connected to, and disconnected from, the container, it can very efficiently carry a large number of containers one after another from one place to another.

Other features and advantages of this invention will become apparent from the following description and the accompanying drawings.

DETAILED DESCRIPTION OF THE INVENTION

Figure 1:
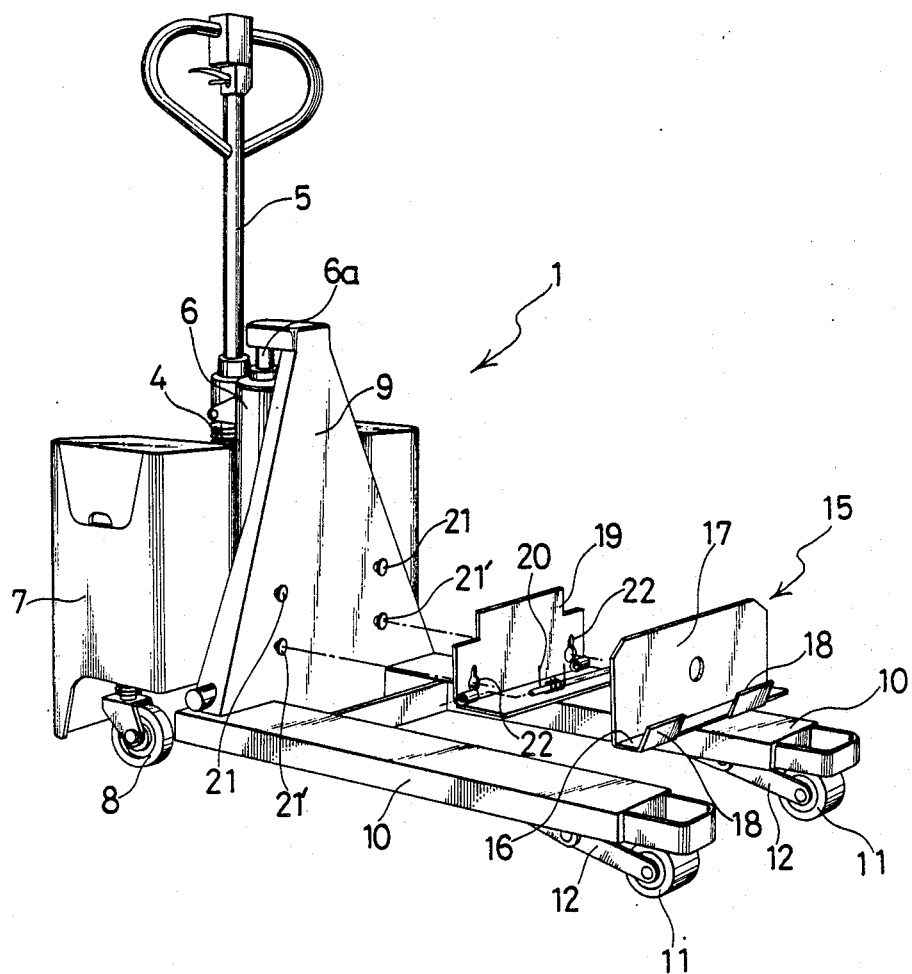
FIG. 1 is a partly exploded perspective view of a vehicle embodying this invention.

A vehicle embodying this invention is shown at 1 in FIG. 1 and includes a body including a base 2 carrying a driving wheel 3 equipped with a motor. A hydraulic cylinder 6 is vertically supported on the base 2. A hydraulic pump 4 is connected to the cylinder 6 and a pump-actuating and steering post 5 is upstanding from the pump 4. These components, which form a driving unit, and a battery not shown are all substantially enclosed in a housing 7. They are horizontally rotatable together if the post 5 is rotated about its own axis. A pair of auxiliary wheels 8 are provided on the opposite sides, respectively, of the wheel 3 and the base 2 is supported on the wheels 3 and 8. The cylinder 6 contains an upright piston rod 6i a which is axially movable into and out of the cylinder 6.

A container carrier is provided in front of the housing 7. It includes a triangular base plate 9 extending along the housing 7 and inclined slightly to the vertical. The base plate 9 has at its top a horizontal projection supported horizontally rotatably on the upper end of the piston rod 6a. The base plate 9 is vertically movable along the adjacent wall of the housing 7 with the vertical movement of the piston rod 6a. A pair of elongate plates 10 project like two prongs of a fork from the lower end of the base plate 9 and extend horizontally in a mutually spaced apart and parallel relation away from the housing 7.

Figure 2A:
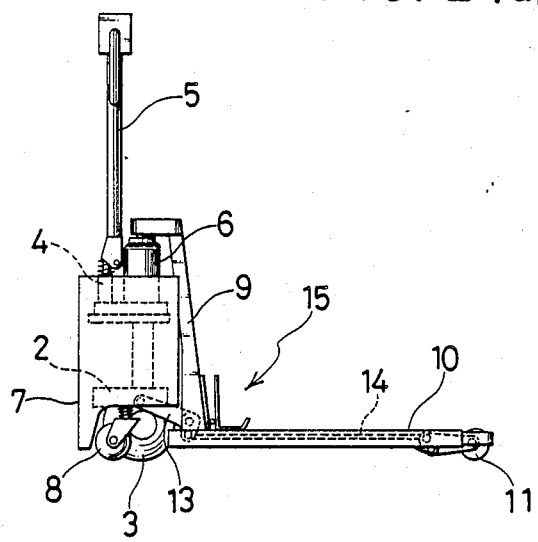
FIG. 2(a) is a side elevational view on a reduced scale of the vehicle with a carrier shown in its lowered position.
Figure 2B:
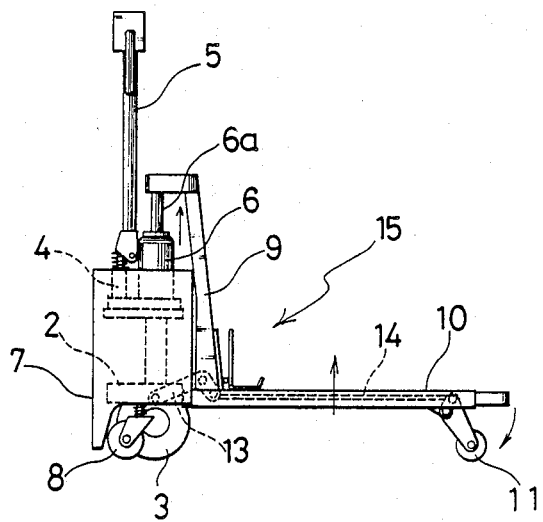
FIG. 2(b) is a view similar to FIG. 2(a), but showing the carrier in its raised position.

The carrier is provided with a pair of transversely spaced apart front wheels 11. Each wheel 11 is supported on a bracket 12 which is in turn supported vertically rotatably on the underside of one of the elongate plates 10 at its free end. Each bracket 12 is rotatably supported on one end of a rod 14 extending along one of the elongate fork plates 10, while an L-shaped link 13 has one end connected rotatably to the other end of the rod 14, as shown in FIGURES 2(a) and 2(b). The link 13 is rotatably connected to the base plate 9 and the other end thereof is rotatably connected to the base 2. The post 5 is tiltable to actuate the pump 4 and thereby supply a hydraulic fluid into the cylinder 6, whereupon the piston rod 6a is moved up to raise the base plate 9, as shown in FIG. 2(b). If the base plate 9 is raised, the L-shaped links 13 are rotated or pulled upward to push the rods 14 forward, whereupon the brackets 12 are rotated downward to lower the wheels 11, as shown in FIGURE 2(b). The fork plates 10 are, thus, vertically movable, while they are maintained in their horizontal positions.

A container supporting member 15 is removably provided on the fork plates 10 adjacent to the base plate 9. The container supporting member 15 has a horizontally extending elongate bottom portion 16 lying above the fork plates 10 at right angles thereto, and an upright back portion 17 extending upward from one of two longitudinal edges of the bottom portion 16. The member 15 also has a pair of somewhat inclined front portions 18 which are both by far smaller than the back portion 17. The front portions 18 are spaced apart from each other along the bottom portion 16 and rise from the other longitudinal edge thereof at an angle to the bottom portion 16. The front portions 18 lie in a common inclined plane and gradually increase their distance from the back portion 17 as they rise from the bottom portion 16. The back and front portions 17 and 18 define therebetween a depression in which a part of a container can be received, as will hereinafter be described in further detail.

Figure 3:
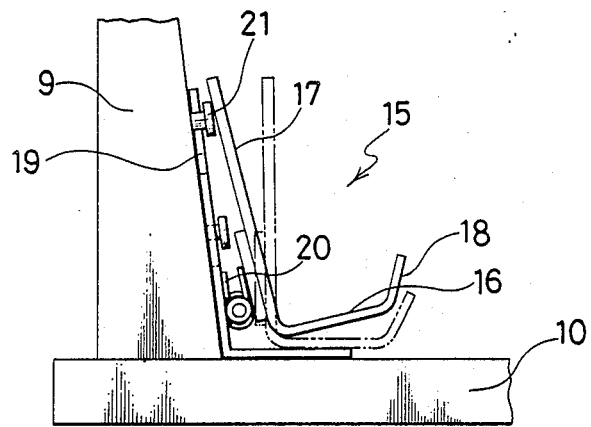
FIG. 3 is an enlarged side elevational view of a container supporting member supported rotatably on the carrier.

A mounting plate 19 having a substantially L-shaped cross section is removably attached to the base plate 9 for mounting the container supporting member 15 thereon. The mounting plate 19 has a slightly inclined upstanding portion contacting the base plate 9, as shown in FIG. 3. The container supporting member 15 is rotatably supported on the mounting plate 19 by a pin extending horizontally along the lower edge of its back portion 17 and having a pair of ends held by the mounting plate 19, and is rotatable about the lower edge of its back portion 17 between its upright position and its inclined position in which its back portion 17 substantially rests on the upstanding portion of the mounting plate 19, as shown in FIG. 3. A coiled wire spring 20 is wound about the pin and has a pair of ends held against the back portion 17 of the container supporting member 15 and the mounting plate 19, respectively, for urging the portion 17 away from the plate 19 to maintain it in its upright position.

The base plate 9 is provided with two vertically spaced apart pairs of screws 21 and 21' each having a head. The upper screws 21 are horizontally spaced apart from each other and the lower screws 21' are likewise spaced apart from each other. The upstanding portion of the mounting plate 19 is provided therethrough with a pair of horizontally spaced apart vertical slots 22 of varying width each having an upper portion which is smaller in width than its lower portion. The upper screws 21, or the lower screws 21' are selectively used for mounting the container supporting member 15 at one of two different levels of height. The head of each screw 21 or 21' can be passed through the lower portion of one of the slots 22, and if the mounting plate 19 is slightly lowered, it is secured to the base plate 9 by the screws 21 or 21'.

Figure 4A:
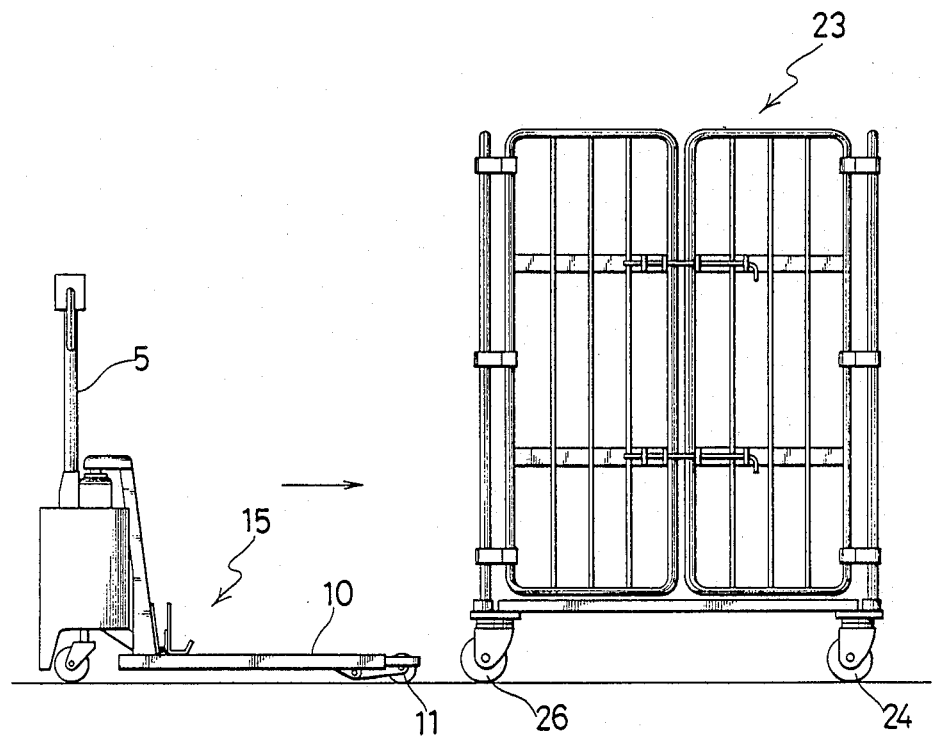
FIGS. 4(a) to 4(c) are a series of side elevational views showing the vehicle being joined to a container.
Figure 4B:
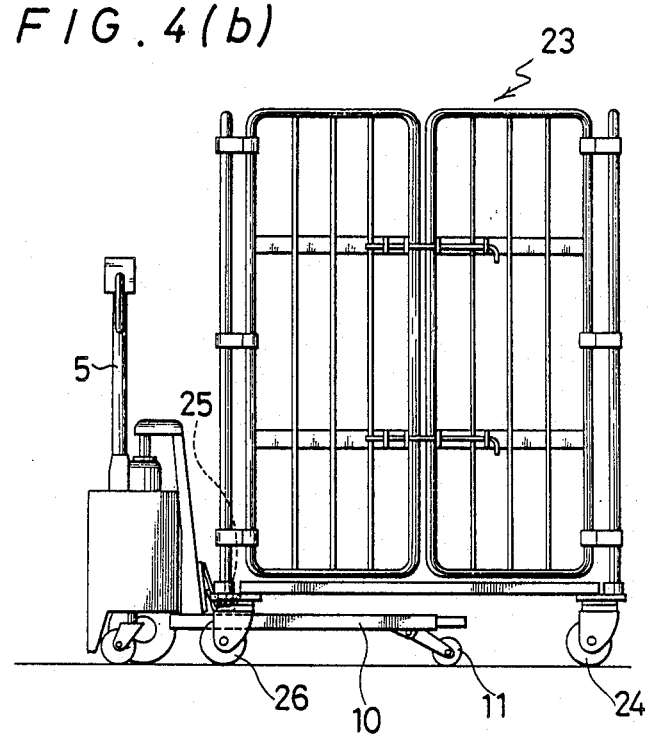
Figure 4C:
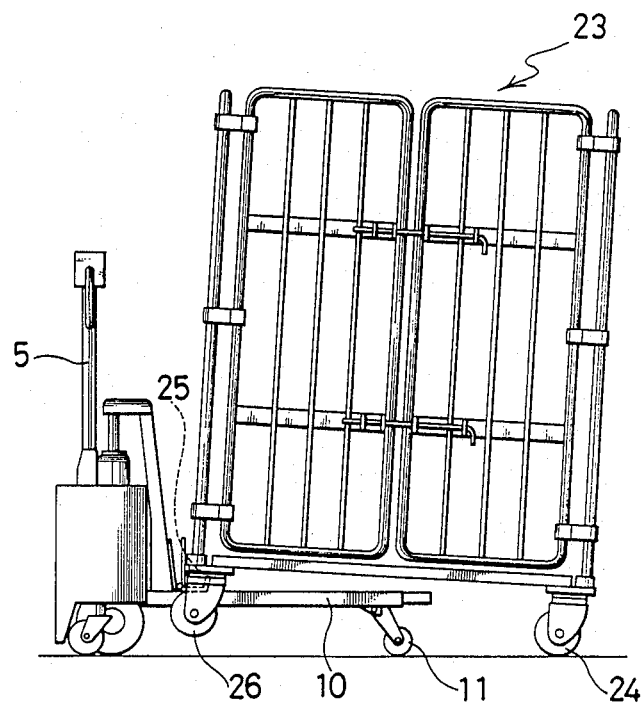

Attention is now directed to FIGS. 4(a) to 4(c) showing by way of example how the vehicle 1 as hereinabove described can be used for carrying a container with casters from one place to another. A roll box pallet 23 having casters 24 at one end and fixed wheels 26 at the other end is shown by way of example as the container to be carried. The vehicle is drawn up in front of that end of the pallet 23 which is provided with the wheels 26, and the carrier plates 10 are lowered to their lowermost positions, as shown in FIG. 4(a). The carrier plates 10 are, then, inserted below the bottom of the pallet 23 until a horizontal member 25 forming a part of the pallet 23 at its bottom and extending along its end abuts on the back portion 17 of the container supporting member 15. Then, the carrier plates 10 are raised, whereby the horizontal member 25 is held between the back and front portions 17 and 18 of the container supporting member 15, as shown in FIG. 4(b). The carrier plates 10 are, then, further raised, whereby the wheels 26 are lifted from the ground, while the casters 24 stay on the ground, as shown in FIG. 4(c).

Figure 5:
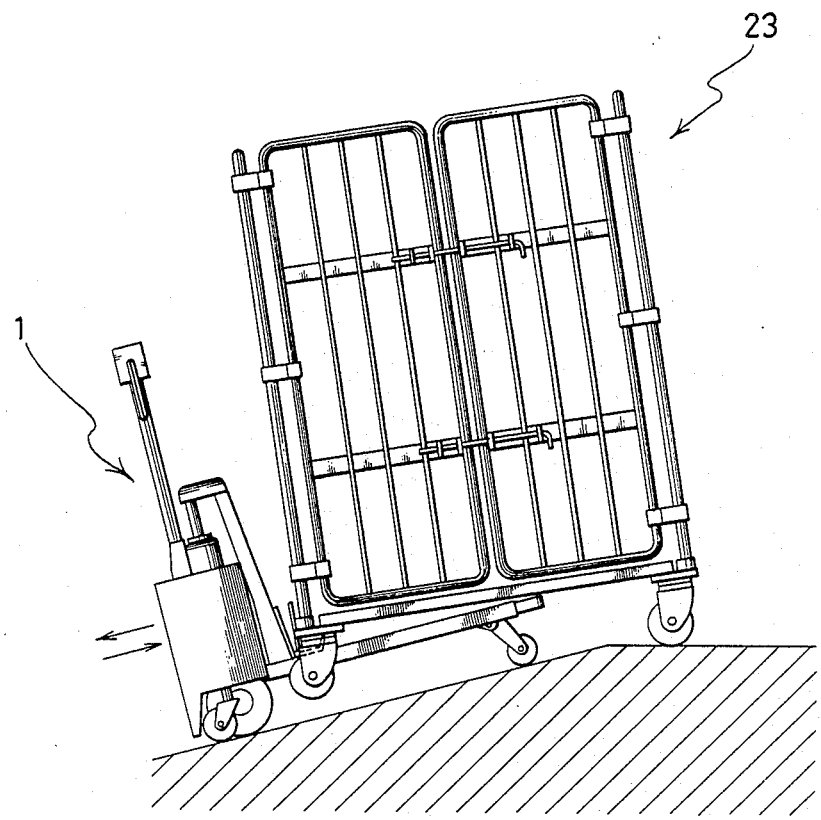
FIG. 5 is a view similar to FIG. 4(c), but showing the vehicle carrying the container along a horizontal and sloping way.

The vehicle of this invention has its center of gravity located toward its rear portion in which the driving unit is provided. When the container is joined to the vehicle, its weight bears substantially on the front portion of the vehicle. Therefore, a good balance of weight can be maintained between the vehicle and the container and the container can be moved smoothly with the vehicle. In this container, it is particularly preferable that the container supporting member be so positioned that its distance from the front end of the vehicle may be three times as large as its distance from the rear end thereof. The vehicle can carry the container easily even along a narrow or curved passage. It is particularly useful for carrying the container along a passage having a horizontal surface and a sloping surface which is contiguous thereto, as shown in FIG. 5.

The container supporting member is rearwardly tiltable to absorb any impact that may be caused by the horizontal member of the container abutting violently on its back portion, and thereby prevent the container from springing back. As the depression defined between the front and back portions of the container supporting member has a width which decreases from its top to its bottom, the horizontal member of the container is securely held therein by its weight.

Although the container supporting member has been described as being removably attached to the base plate by the screws, it can alternatively be attached tot eh ends of the fork plates adjacent to the base plate, or can be secured by bolts. Although the carrier has been described as comprising two elongate plates shaped like prongs of a fork, it may also comprise any other structure in the form of a plate.

What is claimed is:

1. A vehicle for carrying a container from one place to another, the container having a first end and a second end with casters for supporting at least the second end thereof, said vehicle comprising (a) a mobile body with wheels resting on the ground and with means for driving said wheels to move the mobile body, (b) a carrier projecting forward from the mobile body and supported at a front portion thereof by wheels resting on the ground, (c) means provided in the mobile body for moving the carrier between a lower position where the carrier does not support the container and an upper position where the carrier supports the container at a first end thereof so that said first end of the container are lifted off of the ground while the caster at said second end thereof is allowed to rest on the ground, (d) a support member provided on the carrier for directly receiving and supporting said first end of the container when the carrier is in said upper position, said support member being located between the mobile body and a middle of the length of the carrier an d having an upright back portion, a bottom portion extending forwardly and horizontally from the bottom of said back portion and a forwardly inclined front portion extending upwardly from the forward edge of said bottom portion and spaced apart from said back portion and having a smaller height than said back portion, said front and back portions defining therebetween a space for receiving said first end of the container, and (e) a mounting plate removably attached to said carrier, said mounting plate having resilient means for connecting the lower end of said back portion of said support member to the mounting plate in such a manner as to normally urge the support member to a first position where the back portion thereof stands upright, but allow the support member to incline to a second position where an upper portion of the back portion thereof is nearer to the mobile body when said first end of the container abuts on the back portion thereof.

2. A vehicle as set forth in claim 1 wherein the front portion of the support member consists of a pair of projections which are spaced apart from each other along a transverse direction of the carrier.

* * * * *

UNITED STATES PATENT AND TRADEMARK OFFICE
CERTIFICATE OF CORRECTION

PATENT NO. : 4,884,936
DATED : December 5, 1989
INVENTOR(S) : Hiroyuki Kawada

It is certified that error appears in the above-identified patent and that said Letters Patent is hereby corrected as shown below:

At Column 2, line 55 delete "rod 6i a" and insert --rod 6a--.

At Column 4, line 37 delete "container" and insert --connection--.

At Column 4, line 58 delete "tot eh" and insert --to the--.

At Column 5, line 12 delete "are" and insert --is--.

At Column 5, line 12 delete "caster" and insert --casters--.

UNITED STATES PATENT AND TRADEMARK OFFICE
CERTIFICATE OF CORRECTION

PATENT NO. : 4,884,936

DATED : December 5, 1989

INVENTOR(S) : Horoyuki Kawada

It is certified that error appears in the above-identified patent and that said Letters Patent is hereby corrected as shown below:

At Column 5, line 13 delete "is" and insert --are--.

At Column 5, line 20 delete "an d" and insert --and--.

At Column 6, line 8 after "for" insert --pivotally--.

Signed and Sealed this

Sixth Day of August, 1991

*Attest:*

HARRY F. MANBECK, JR.

*Attesting Officer*

*Commissioner of Patents and Trademarks*